US007086668B2

(12) United States Patent
Takasaki et al.

(10) Patent No.: US 7,086,668 B2
(45) Date of Patent: Aug. 8, 2006

(54) COUPLING ASSEMBLY (75) Inventors: Hiromi Takasaki, Sano (JP);
Yoshikazu Takamatsu, Sano (JP)

(73) Assignee: Calsonic Kansai Corporation, Tokyo (JP)

( * ) Notice: Subject to any disclaimer, the term of this patent is extended or adjusted under 35 U.S.C. 154(b) by 35 days.

(21) Appl. No.: 10/781,530

(22) Filed: Feb. 17, 2004

(65) Prior Publication Data
US 2004/0183298 A1    Sep. 23, 2004

(30) Foreign Application Priority Data
Feb. 17, 2003    (JP)    ............ P 2003-038637

(51) Int. Cl.
*F16L 39/00* (2006.01)
*F16L 13/08* (2006.01)

(52) U.S. Cl. .............. 285/123.3; 285/123.1; 285/289.1; 285/289.5

(58) Field of Classification Search ............ 285/123.1, 285/123.3, 124.1, 124.2, 124.3, 124.4, 289.1, 285/289.5
See application file for complete search history.

(56) References Cited

U.S. PATENT DOCUMENTS

| 2,033,122 | A | * | 3/1936 | Cornell, Jr. ................. 228/246 |
| 3,372,715 | A | | 3/1968 | Ashton |
| 3,567,136 | A | | 3/1971 | Garrett |
| 3,638,970 | A | * | 2/1972 | Sandquist et al. ............ 285/24 |
| 4,199,955 | A | | 4/1980 | Jonsson |
| 5,931,184 | A | * | 8/1999 | Armenia et al. ............ 137/312 |
| 6,009,908 | A | | 1/2000 | Hartnagel et al. |
| 6,065,783 | A | * | 5/2000 | Chiarelli .................. 285/289.5 |
| 6,131,615 | A | | 10/2000 | Hartnagel et al. |
| 6,145,545 | A | | 11/2000 | Hartnagel et al. |
| 6,446,857 | B1 | * | 9/2002 | Kent et al. .................. 228/139 |
| 6,533,328 | B1 | * | 3/2003 | Takamatsu ............ 285/123.15 |
| 2001/0020786 | A1 | * | 9/2001 | Takamatsu et al. ...... 285/123.1 |
| 2003/0218332 | A1 | * | 11/2003 | Takasaki et al. ......... 285/123.3 |

FOREIGN PATENT DOCUMENTS

| CH | 290979 | 5/1953 |
| EP | 1 128 120 A2 | 8/2001 |
| FR | 641519 | 8/1928 |
| JP | 1-126489 | 5/1989 |
| JP | 8-338585 | 12/1996 |
| JP | 2001-235081 | 8/2001 |

* cited by examiner

*Primary Examiner*—James M. Hewitt
(74) *Attorney, Agent, or Firm*—Kilpatrick Stockton LLP; Brenda O. Holmes (57) ABSTRACT

A coupling for a double tube is configured to connect with the double tube. The double tube includes an outer tube for a first fluid to flow therethrough. The double tube includes an inner tube provided inside of the outer tube and having an end protruding from the outer tube, the inner tube for a second fluid to flow therethrough. The coupling includes a branched portion brazed to an end of the outer tube and brazed to an end of the inner tube, with the end of the inner tube protruding outside through the branched portion. The branched portion is formed as a curved tube having a curved portion. The branched portion has an end joined to an end of the outer tube, with the curved portion having a through-hole for the inner tube to pass therethrough.

9 Claims, 11 Drawing Sheets

COUPLING ASSEMBLY

CROSS-REFERENCE TO RELATED APPLICATIONS

This application is based upon and claims the benefit of priority from Japanese Patent Application No. 2003-038637 filed on Feb. 17, 2003; the entire contents of which are incorporated herein by reference.

BACKGROUND OF THE INVENTION

The present invention relates to a double tube coupling used for connecting a double tube including an outer tube and an inner tube provided inside the outer tube.

A double tube includes an outer tube for circulating a first fluid. This coupling includes an inner tube provided inside the outer tube for circulating a second fluid. The inner tube extends outward from the end of the outer tube.

A double tube coupling includes a first joint for joining the outer tube and a first outside tube each other for guiding the first fluid. The coupling includes a second joint for joining the inner tube and a second outside tube each other by brazing for guiding the second fluid. The coupling includes a branched portion communicating with the first joint and having a hole for connecting the second joint from outside. The outer tube of the double tube is connected to the branched portion and the inner tube is inserted from the hole into the second joint.

SUMMARY OF THE INVENTION

However, the double tube coupling has the branched portion which is formed either by cutting work or by assembling a plurality of members. Such a formation process incurs an increase in manufacturing costs.

This branched portion has a large thickness, and the brazing work consumes long preheating time and productivity thereby declines.

An object of the present invention is to provide a double tube coupling with low manufacturing costs. Another object of the present invention is to provide a double tube coupling which can shorten time for brazing.

The invention has a first aspect directed to the following coupling for a double tube. The coupling is configured to connect with the double tube. The double tube includes an outer tube for a first fluid to flow therethrough. The double tube includes an inner tube provided inside of the outer tube and having an end protruding from the outer tube, the inner tube for a second fluid to flow therethrough. The coupling includes a branched portion brazed to an end of the outer tube and brazed to an end of the inner tube, with the end of the inner tube protruding outside through the branched portion. The branched portion is formed as a curved tube having a curved portion. The branched portion has an end joined to an end of the outer tube, with the curved portion having a through-hole for the inner tube to pass therethrough.

Preferably, the curved portion has an outer surface having a burr portion in contact with an outer peripheral surface of the inner tube through the through-hole.

Preferably, the branched portion has an end formed with an expanded radial portion configured to receive and position axially the outer tube.

Preferably, the branched portion has an end having a distal end bent outwardly to form a brazing-material holding portion.

Preferably, the curved part has an inner surface formed with a stepped brazing-material holding portion configured to receive and support a ring-shaped brazing material fitted coaxially to the inner tube.

Preferably, the branched portion has an inner surface having a brazing-material layer thereon.

Preferably, the double tube has the inner tube movably inserted radially into the outer tube. The through-hole is positioned to avoid a region having a maximum extension in the curved portion.

The invention has a second aspect directed to the following method of manufacturing a coupling for a double tube. The method includes the step of bending a straight tube having an inner radial size larger than an outer radial size of an inner tube, to form a curved tube having a curved portion. The method includes the step of inserting a punch member into an end of the curved tube for punching through the curved portion to form a through-hole for the inner tube to pass therethrough.

Preferably, the punch member forms a burr portion on an outer surface of the curved portion, the burr portion being in contact with an outer peripheral surface of the inner tube.

Preferably, the punch member forms an expanded radial portion at the end of the curved tube for receiving and positioning radially the outer tube.

Preferably, the punch member bends outwardly a distal end of the end of the curved tube to form a brazing-material holding portion.

Preferably, the punch member forms a stepped brazing-material supporting portion on an inner surface of the curved portion for receiving and supporting a ring-shaped brazing material fitted coaxially to the inner tube.

Preferably, the method includes the step of providing a brazing material on an inner surface of a branched portion. The method includes the step of inserting the inner tube and the outer tube in the branched portion. The method includes the step of heating the brazing material to braze and fix the inner tube and the outer tube to the branched portion.

DETAILED DESCRIPTION OF THE PREFERRED EMBODIMENTS

An embodiment of the present invention will be described with reference to the accompanying drawings.

Figure 1:
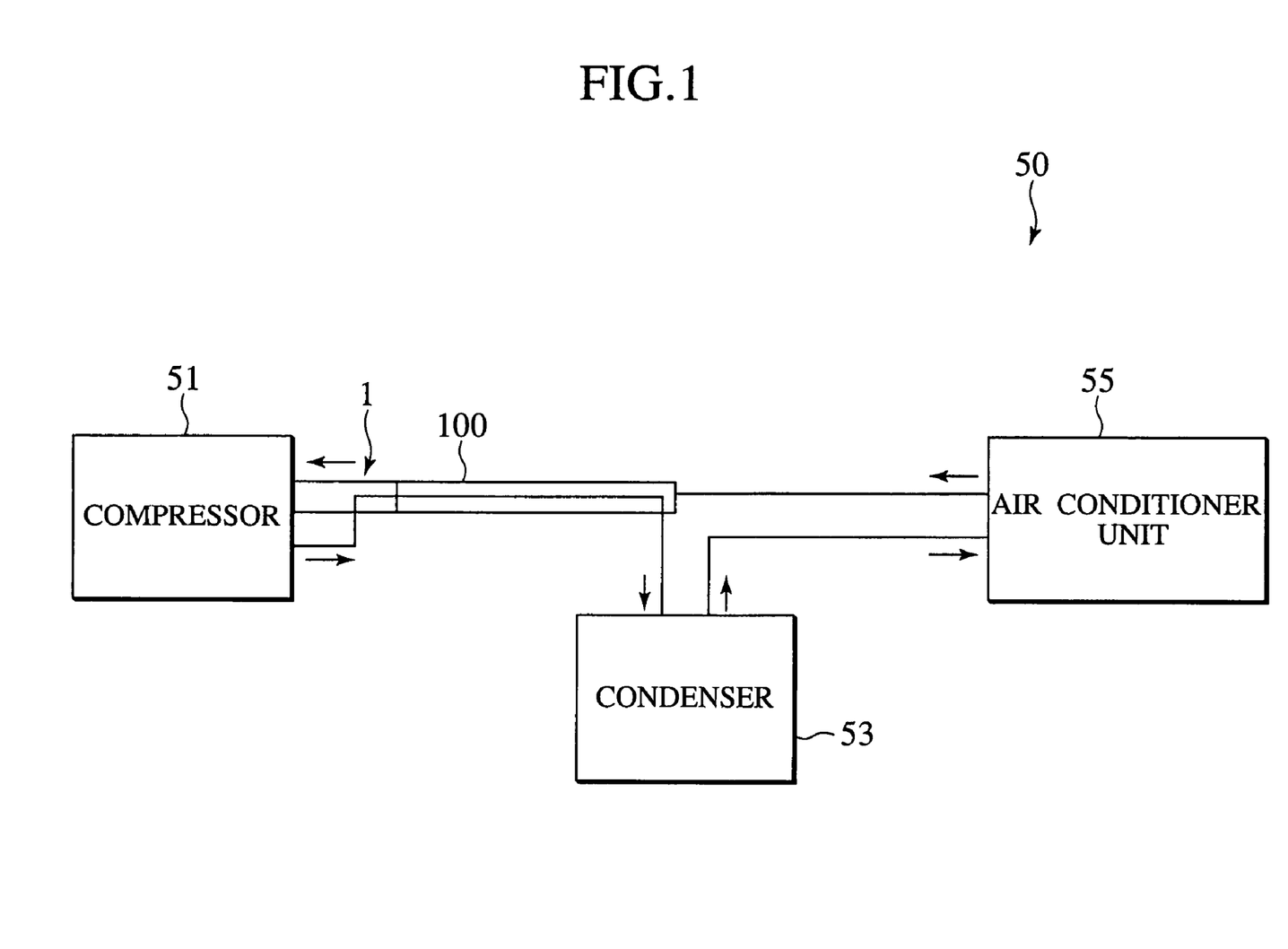
FIG. 1 is a schematic diagram showing an air-conditioner system.

With reference to FIG. 1, an air-conditioner system 50 is applied to a vehicle, for example. The air-conditioner system 50 includes a compressor 51 configured to compress a refrigerant. The air-conditioner system 50 includes a condenser 53 configured to condense the compressed refrigerant. The air-conditioner system 50 includes an air-conditioner unit 55 configured to cool down, for example, the inside of the vehicle in the condensed refrigerant. The refrigerant absorbing the heat returns to compressor 51. In this system, compressor 51 and condenser 53 are connected together with a double tube 100. The compressor 51 and double tube 100 are connected together with a double tube coupling 1.

Figure 2:
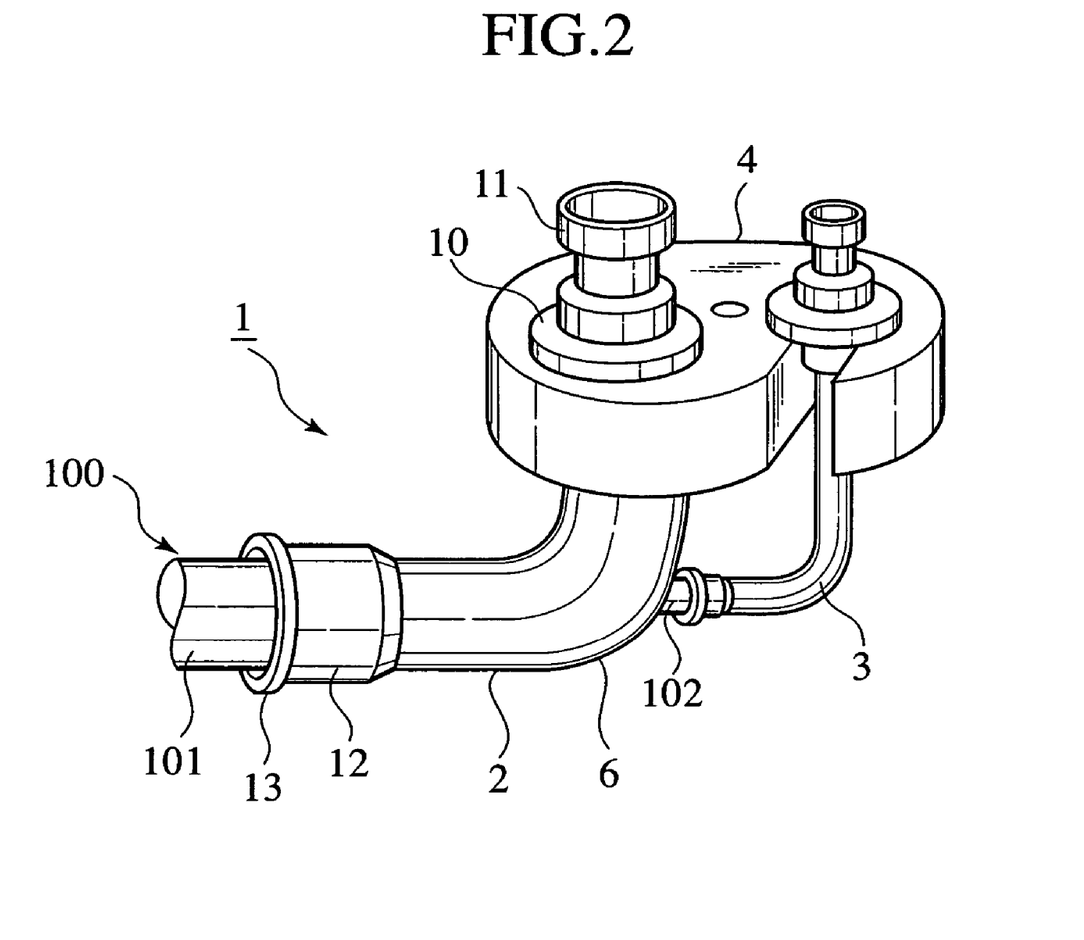
FIG. 2 is an external perspective view of a double tube coupling according to a first embodiment of the present invention.
Figure 3:
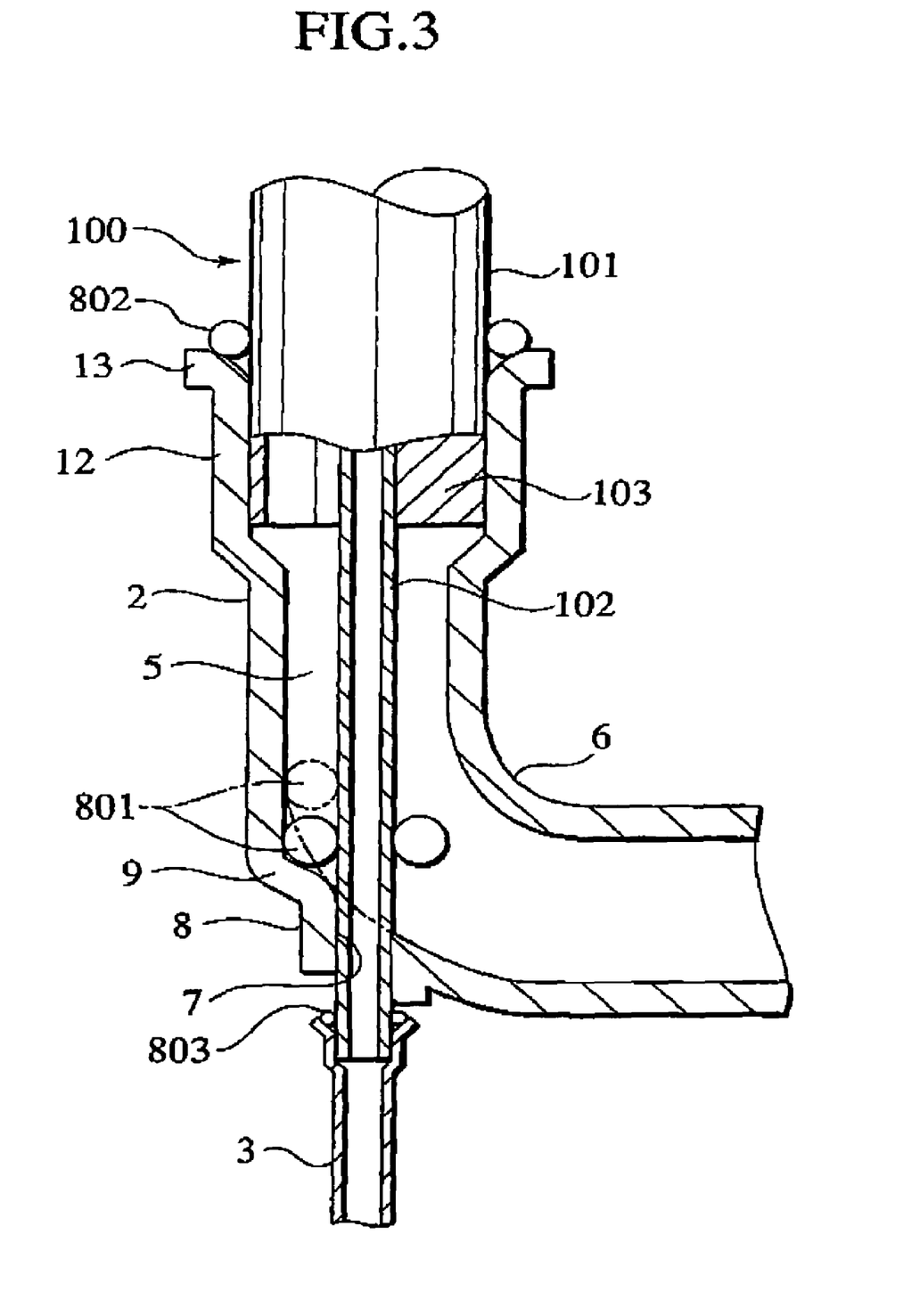
FIG. 3 is a cross-sectional view of primary parts of the double tube coupling of FIG. 2.

The double tube coupling 1 shown in FIG. 2 and FIG. 3 is used to connect double tube 100 to a car air-conditioner system or the like. The double tube 100 includes an outer tube 101 for circulating a first fluid such as the refrigerant. The double tube 100 includes an inner tube 102 provided inside outer tube 101 for circulating a second fluid such as a compressed refrigerant. The double tube 100 includes a joining rib 103 for joining the both tubes. The outer tube 101, inner tube 102, and joining rib 103 are integrally formed either by an extruding process or by a drawing process. The end of outer tube 101 is removed to allow inner tube 102 to protrude from outer tube 101.

With reference to FIG. 3, the double tube coupling 1 includes a branched portion 2, a connecting tube 3, and a coupling flange 4. The branched portion 2 is joined to the end of outer tube 101 by brazing. The branched portion 2 forms an inner path 5 for guiding the first fluid. The branched portion 2 is joined to the inner tube 102 by brazing, with the end of inner tube 102 protruding outward through branched portion 2. In this embodiment, each of branched portion 2, outer tube 101, and inner tube 102 is formed of an aluminum material (such as 3003, Al—Mn alloy) having fine workability.

The branched portion 2 is formed as a curved tube having a quadrant curved portion 6. The branched portion 2 has an end joined to the end of outer tube 101. The branched portion 2 forms curved portion 6 having a through hole 7 for allowing inner tube 102 to pass therethrough. The end of inner tube 102, protruding out of through hole 7, is connected to the end of connecting tube 3. The other end of branched portion 2 and the other end of connecting tube 3 are held by coupling flange 4 (refer to FIG. 2).

The branched portion 2 is manufactured by the following procedures. Firstly, a method of manufacturing a curved tube P4 for forming branched portion 2 will be described with reference to FIG. 3.

Figure 4A:
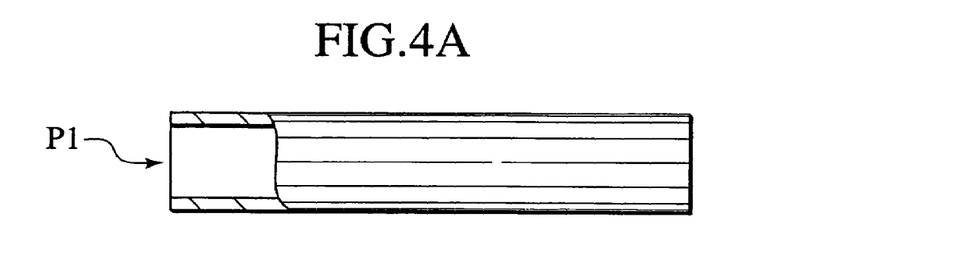
FIGS. 4A, 4B, 4C and 4D are explanatory views of a method of manufacturing a curved tube in FIG. 2.
Figure 4B:
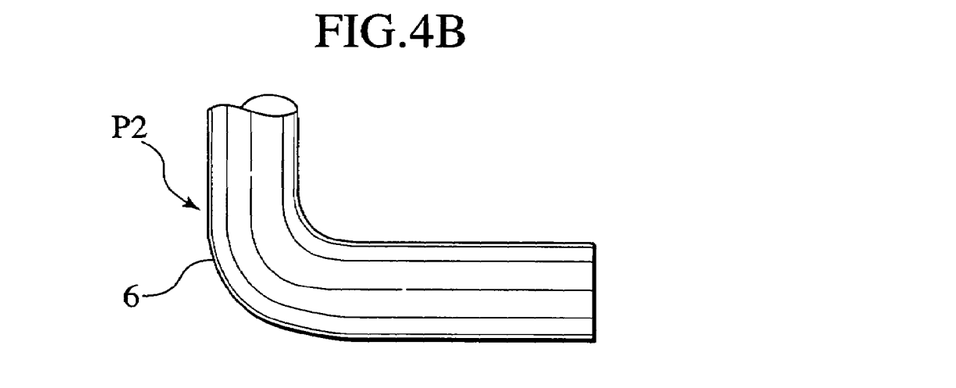
Figure 4C:
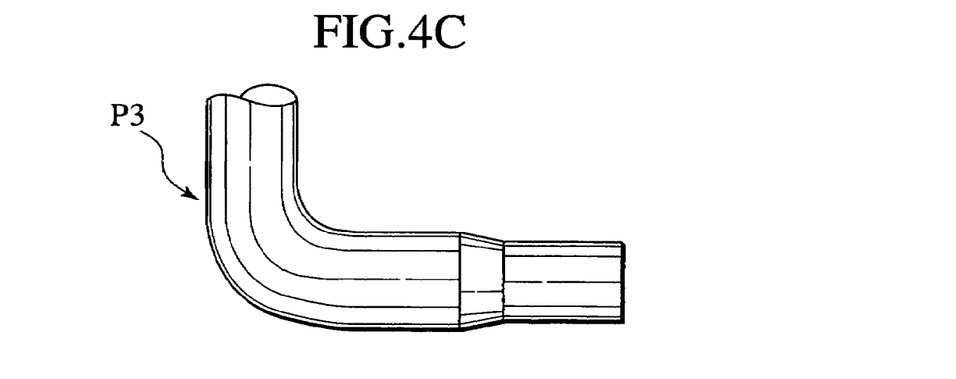
Figure 4D:
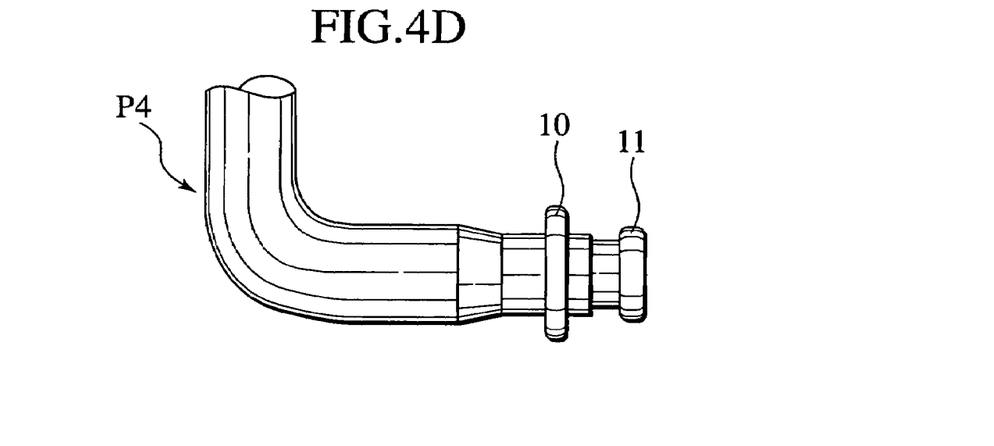

A straight tube P1 is prepared, with an inner diameter greater than an outer diameter of inner tube 102 and with an outer diameter greater than an inner diameter of outer tube 101 (refer to FIG. 4A). This straight tube P1 is subjected to bending and is thereby formed into an L-shaped curved tube P2 having quadrant curved portion 6 (refer to FIG. 4B). The other end of curved tube 2 is swaged, which reduces the diameter (refer to FIG. 4C). The end is subjected to pointing to form flange portions 10 and 11, and a curved tube P4 is thereby finished (refer to FIG. 4D).

Figure 5:
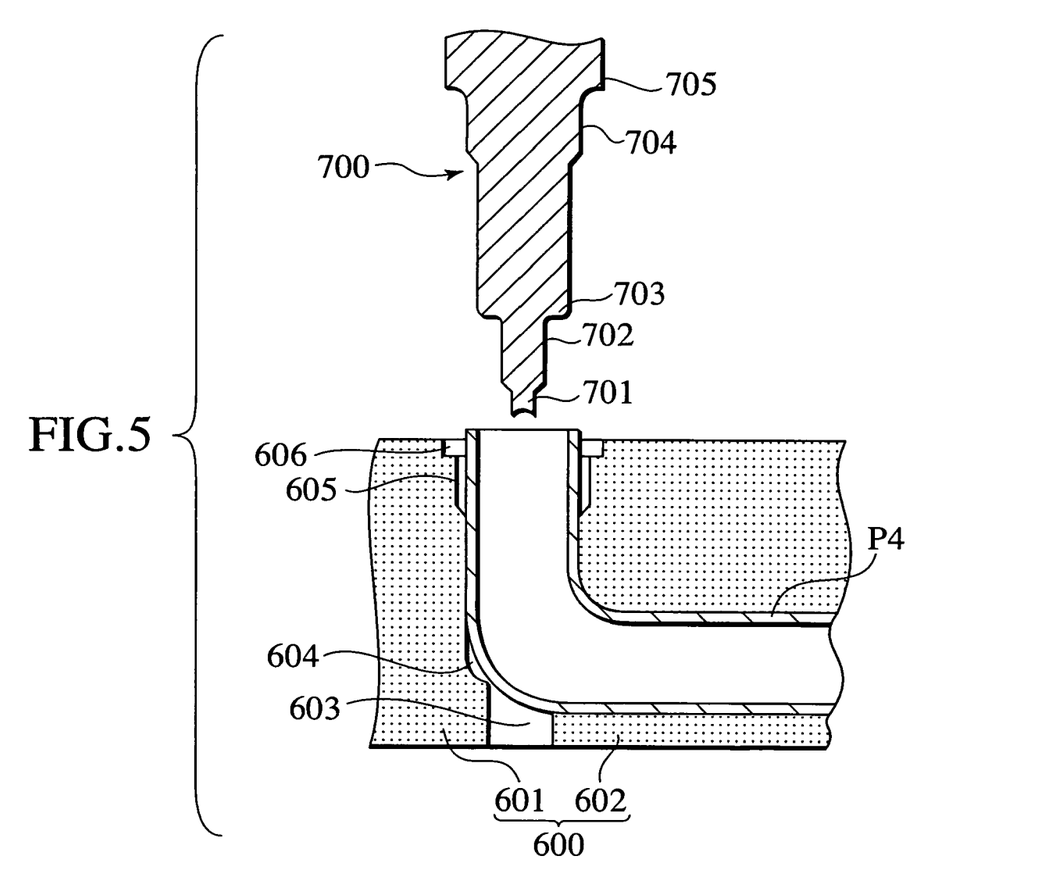
FIG. 5 is a view for explaining a method of manufacturing a branched portion in FIG. 3.

The curved tube P4 thus obtained is set on a press machine having a clamp 600 and a punch 700 as shown in FIG. 5.

The clamp 600 holds curved tube P4 and forms curved tube P4 into a predetermined shape in cooperation with punch 700. The clamp 600 includes two contactable and detachable blocks 601 and 602. The blocks 601 and 602 have therebetween, in order from the bottom, a first region 603 for forming a burr or hole-flange portion, a second region 604 for forming a brazing-material supporting portion, a third region 605 for forming an expanded radial portion, and a fourth region 606 for forming a brazing-material holding portion.

The punch 700 in a multistep cylindrical column shape is inserted in and detached from one end of curved tube P4 held by clamp 600 in the axial direction. The punch 700 has, in order from the bottom, a first portion 701 for forming the through hole, a second portion 702 for forming the burr portion, a third portion 703 for forming the brazing-material supporting portion, a fourth portion 704 for forming the expanded radial portion, and a fifth portion 705 for forming the brazing-material holding portion.

The end surface of first portion 701 is formed into a concave shape so as to reduce resistance during punching, with the acute peripheral portion in a blade shape.

Figure 6:
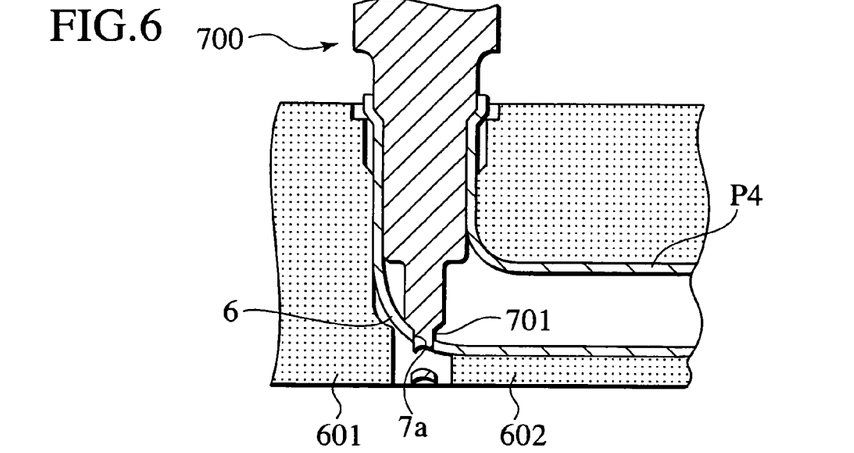
FIG. 6 is another view for explaining the method of manufacturing the branched portion in FIG. 3.

A formation process for branched portion 2 will be described. Firstly, as shown in FIG. 6, the punch 700 is inserted from an end of curved tube P4 in the axial direction. The first portion 701 punches through the curved portion 6 to form a bottom hole 7a of through hole 7.

Figure 7:
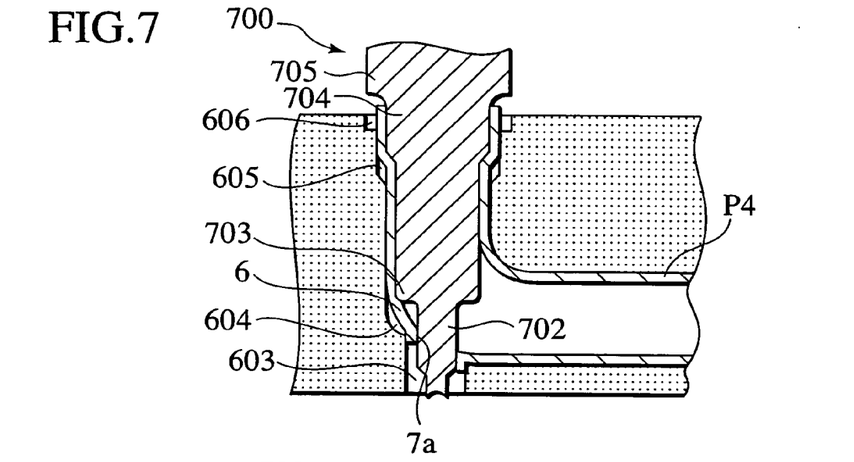
FIG. 7 is another view for explaining the method of manufacturing the branched portion in FIG. 3.
Figure 8:
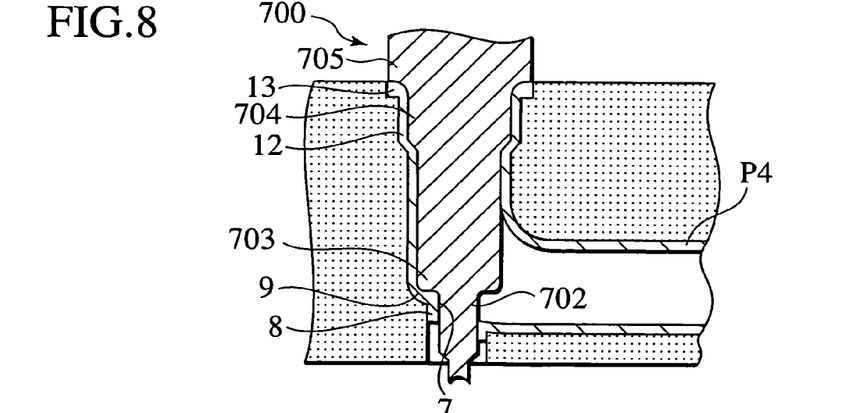
FIG. 8 is another view for explaining the method of manufacturing the branched portion in FIG. 3.

Subsequently, as shown in FIG. 7, the burr-portion forming portion 702 expands radially the bottom hole 7a and third portion 703 presses the inner surface of curved portion 6 downward. In this way, as shown in FIG. 8, the peripheral portion of bottom hole 7a is bent outward, thereby forming a tubular burr portion 8 along the inner surface of first region 603 on the outer surface of curved portion 6. A part of curved portion 6 is deformed to be fitted with second region 604, thereby forming a stepped brazing-material supporting portion 9.

At this time, an end of curved tube P4 is radially expanded by fourth portion 704, thereby forming an expanded radial portion 12 in a shape aligned with third region 605. The end of expanded radial portion 12 is bent outward by fifth portion 705, thereby forming a flange-like brazing-material holding portion 13 in a shape fitted with fourth region 606.

In this way, the pressing of curved tube P4 forms branched portion 2. This formation method achieves manufacturing more easily and at lower costs as compared to formation of a conventional branched portion of a block shape either by cutting work or by assembling a plurality of members.

Connection of double tube 100 and double tube coupling 1 is performed by the following procedures. Ring-shaped brazing materials 801 and 802 are coaxially fitted to the end of inner tube 102 and the end of outer tube 101 of double tube 100, respectively. The double tube 100 is coaxially inserted from an end of branched portion 2. The brazing materials 801 and 802 respectively stop against supporting portion 9 and holding portion 13, respectively. The inner tube 102 and outer tube 101 respectively slide on brazing materials 801 and 802. The end of inner tube 102 comes into hole 7 which is located on the axis of expanded radial portion 12.

The double tube 100 is pushed in, as the end of outer tube 101 abuts against a proximal end of expanded radial portion 12. In this state, as shown in FIG. 3, brazing material 801 is received and supported by brazing-material supporting portion 9. The brazing material 802 is held by holding portion 13. The end of inner tube 102 protrudes outwardly from burr portion 8.

Without the supporting portion 9, as indicated by a chain double-dashed line in FIG. 3, a large gap is provided at the bottom of brazing material 801 between the inner tube 102 and the inner surface of curved portion 6. This gap bears a risk of insufficient brazing. On the contrary, the supporting portion 9 can overcome such a problem, allowing secure brazing between inner tube 102 and curved portion 6.

Figure 9:
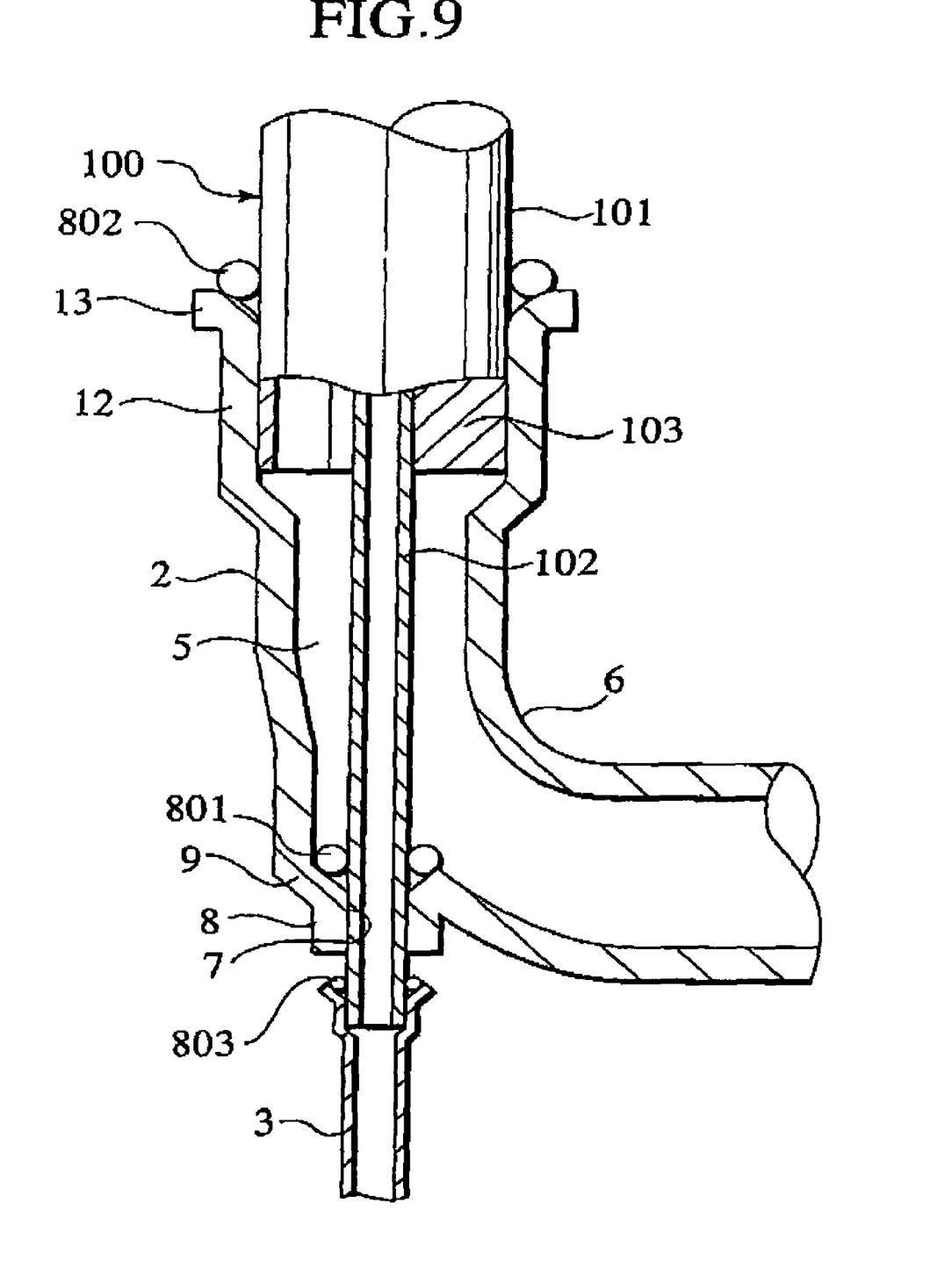
FIG. 9 is a cross-sectional view of primary parts of a double tube coupling according to another embodiment.

As shown in FIG. 9, supporting portion 9 receives and supports brazing material 801 over the entire circumference. This structure stabilizes a position of the brazing material 801 relative to the inner tube 102, allowing secure brazing of inner tube 102 by branched portion 2.

The end of inner tube 102 protruding out of burr portion 8 is fitted coaxially with a ring-shaped brazing material 803 and is connected to an end of connecting tube 3. In this state, branched portion 2 is heated to melt brazing materials 801, 802, and 803 for brazing. The melted ring-shaped brazing materials flow through inner tube 102 and come into gaps between through hole 7 of burr portion 8 and inner tube 102. During processing of burr portion 8, if an angle R or a taper (not shown) is provided on the edge of burr portion 8 in contact with inner tube 102, an insertion performance of inner tube 102 and entrance of the brazing material are further improved. Pipe-shaped thin branched portion 2 achieves a short time brazing for a shorter preheating time as compared to the conventional one of the block shape.

In this embodiment, the provision of burr portion 8 inner allows stable holding of tube 102 and an enlarged brazing area. This structure securely fixes inner tube 102 to branched portion 2.

Figure 10:
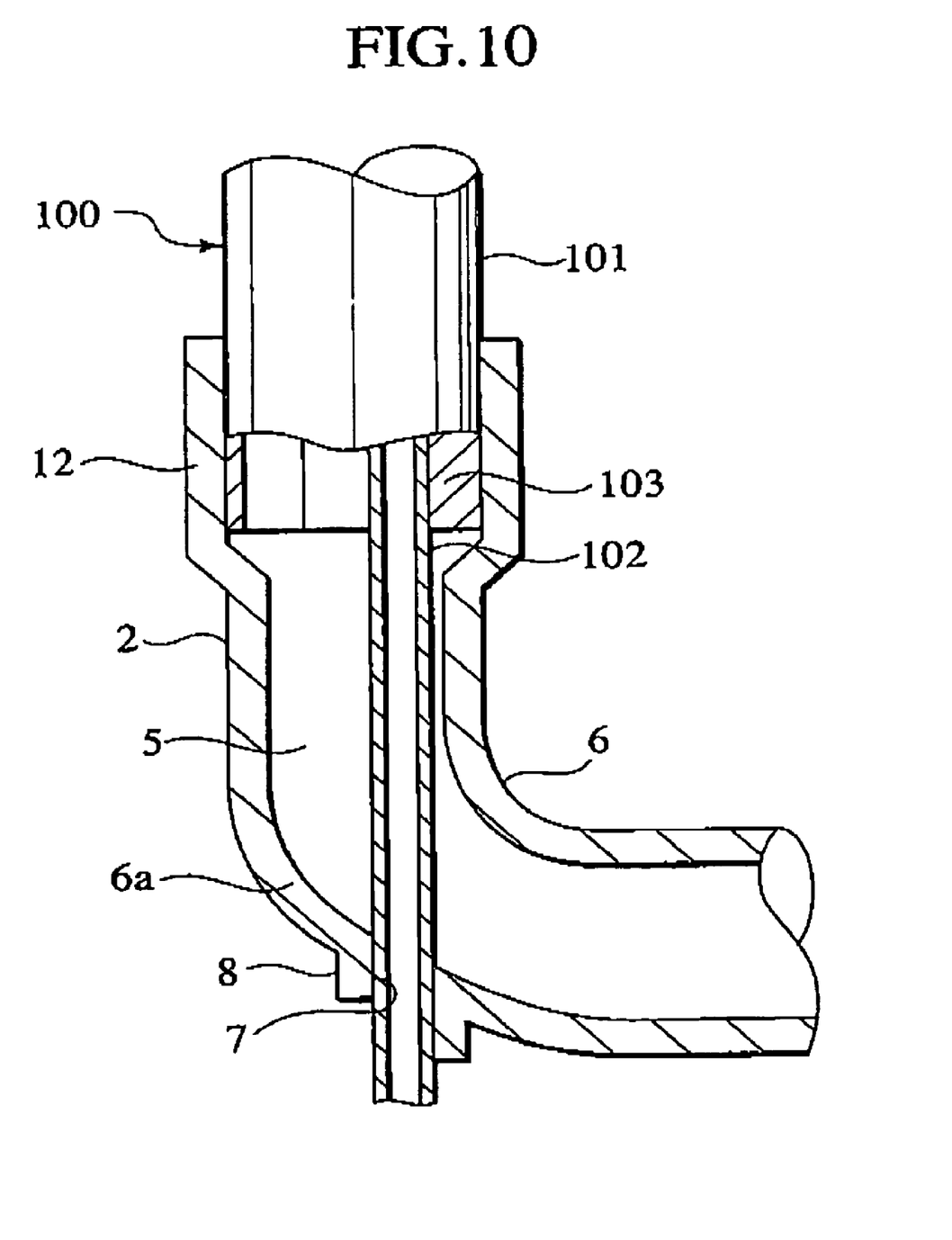
FIG. 10 is a cross-sectional view of primary parts of a double tube coupling according to still another embodiment.

The inner tube 102 is fixed to outer tube 101 through rib 103. Meanwhile, the inner tube 102 is radially movably inserted relative to outer tube 101. In this case, as shown in FIG. 10, through hole 7 is formed such that inner tube 102 is decentered from outer tube 101 and is located to avoid region 6a having a maximum extension in curved portion 6. Such a location improves mechanical strength of a brazed portion between inner tube 102 and curved portion 6.

In this example, a brazing-material layer is provided on the entire inner surface of branched portion 2. After inserting outer tube 101 and inner tube 102 into branched portion 2, the brazing-material layer is heated to braze fix outer tube 101 and inner tube 102 to branched portion 2. Accordingly, the brazing materials 801 and 802 separate from branched portion 2 are not required, and productivity is thereby improved. The brazing-material layer is provided at a fewer positions as compared to the case of providing the brazing-material layers respectively on outer tube 101 and inner tube 102, which reduces the productive costs.

The other end of branched portion 2, to which double tube 100 is braze fixed, is fitted in coupling flange 4 (refer to FIG. 2). The other end of connecting tube 3 is also fitted to coupling flange 4. Ring-shaped sealing members (not shown) are fitted in the outer peripheral portion on the other end of branched portion 2 and to the peripheral portion on the other end of connecting tube 3. The other end of branched portion 2 is connected to a first external connecting tube (not shown) for guiding the first fluid, with the other end of branched portion 2 externally fitted to the first external connecting tube. The other end of connecting tube 3 is connected to a second external connecting tube (not shown) for guiding the second fluid, with the other end of connecting tube 3 externally fitted to the second external connecting tube.

This embodiment applies a male connection structure where the first and second external connecting tubes are externally fitted to branched portion 2 and connecting tube 3. On the contrary, it may be to apply a female connection structure where the first and second external connecting tubes are inserted into branched portion 2 and connecting tube 3.

Figure 11:
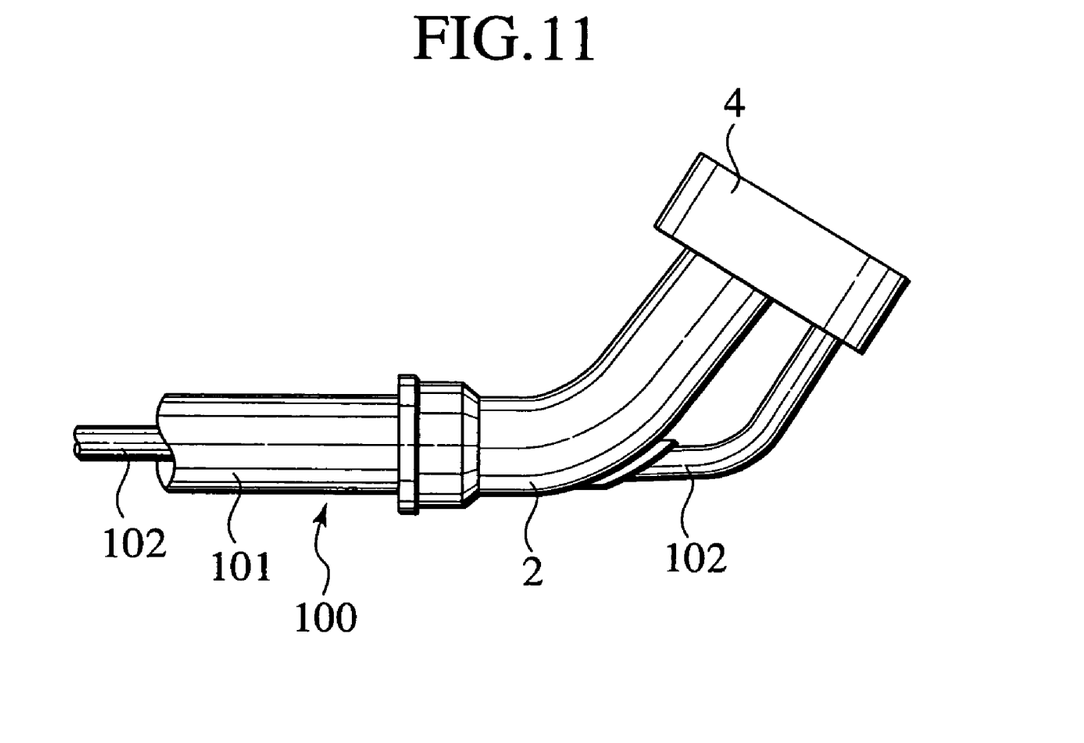
FIG. 11 is a side view of still another embodiment.
Figure 12:
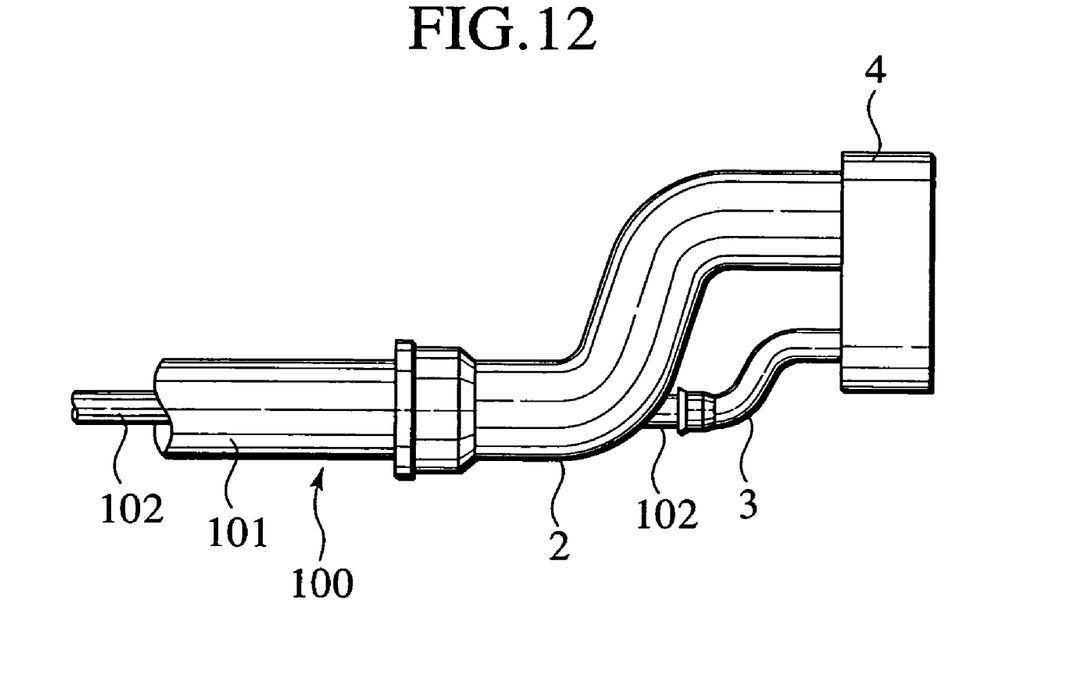
FIG. 12 is a side view of still another embodiment.

According to the present invention, as shown in FIG. 11 and FIG. 12, change of a curved shape of branched portion 2 may change an orientation of coupling flange 4 relative to double tube 100 arbitrarily.

Figure 13:
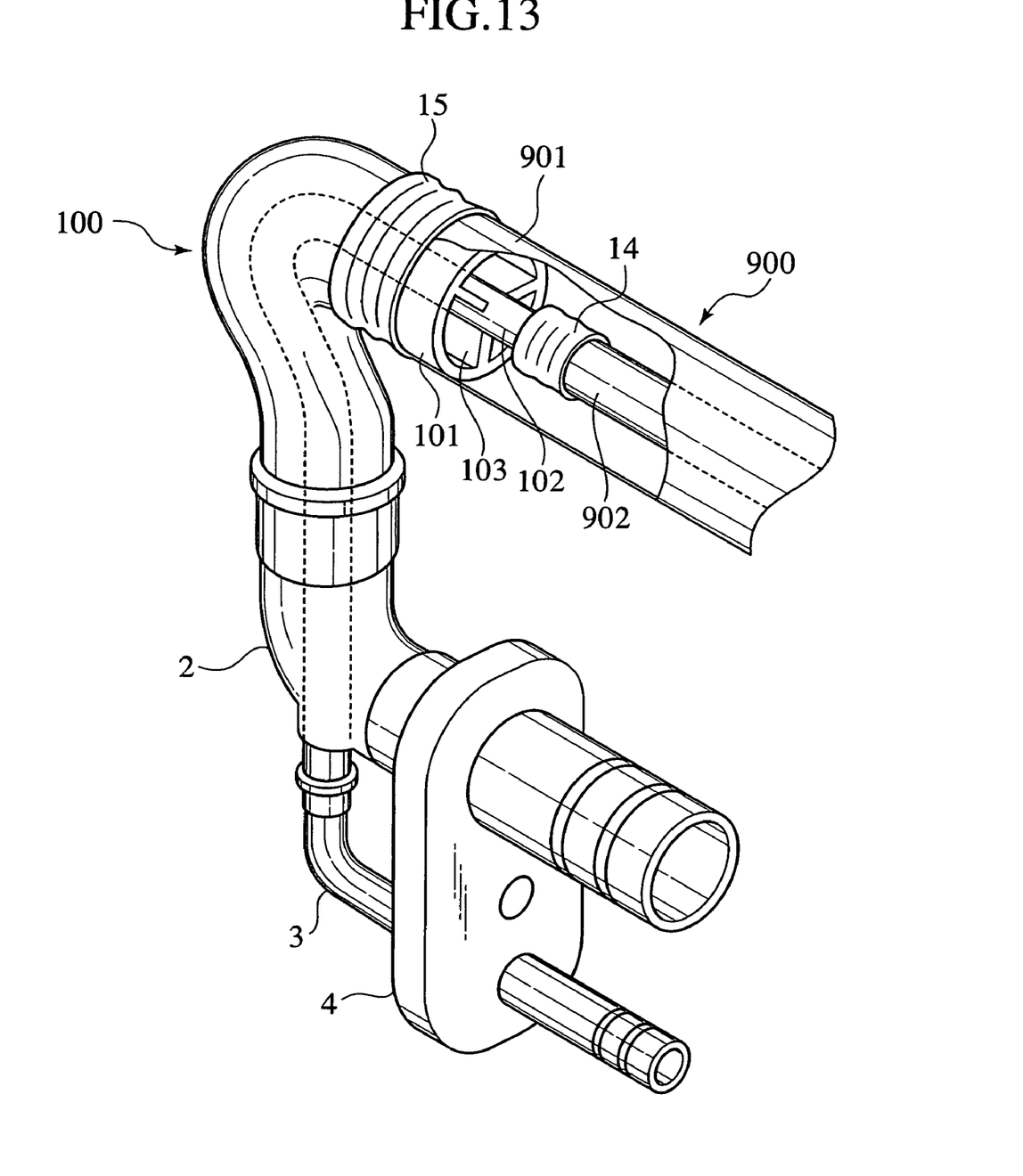
FIG. 13 is a partially exploded external perspective view of still another embodiment.

The present invention is also applicable to a structure in which the middle of double tube 100 is joined by use of an elastic body such as a flexible hose. FIG. 13 illustrates one example for such a case. A flexible hose 900 includes an outer hose 901, and an inner hose 902 inserted into the outer hose 901.

In the double tube 100, the inner tube 102 protrudes out of outer tube 101 on the opposite end to a connecting end to branched portion 2 as well. The end of inner hose 902 is externally fitted to the outer peripheral surface of the end of inner tube 102. The inner hose 902 and inner tube 102 are fixed together by crimping an inner collar 14 which is fitted on the outer peripheral surface.

The end of outer hose 901 is externally fitted to an outer peripheral surface of the end of outer tube 101. The outer hose 901 and outer tube 101 are fixed together by crimping an outer collar 15 which is mounted on the outer peripheral surface.

Figure 14:
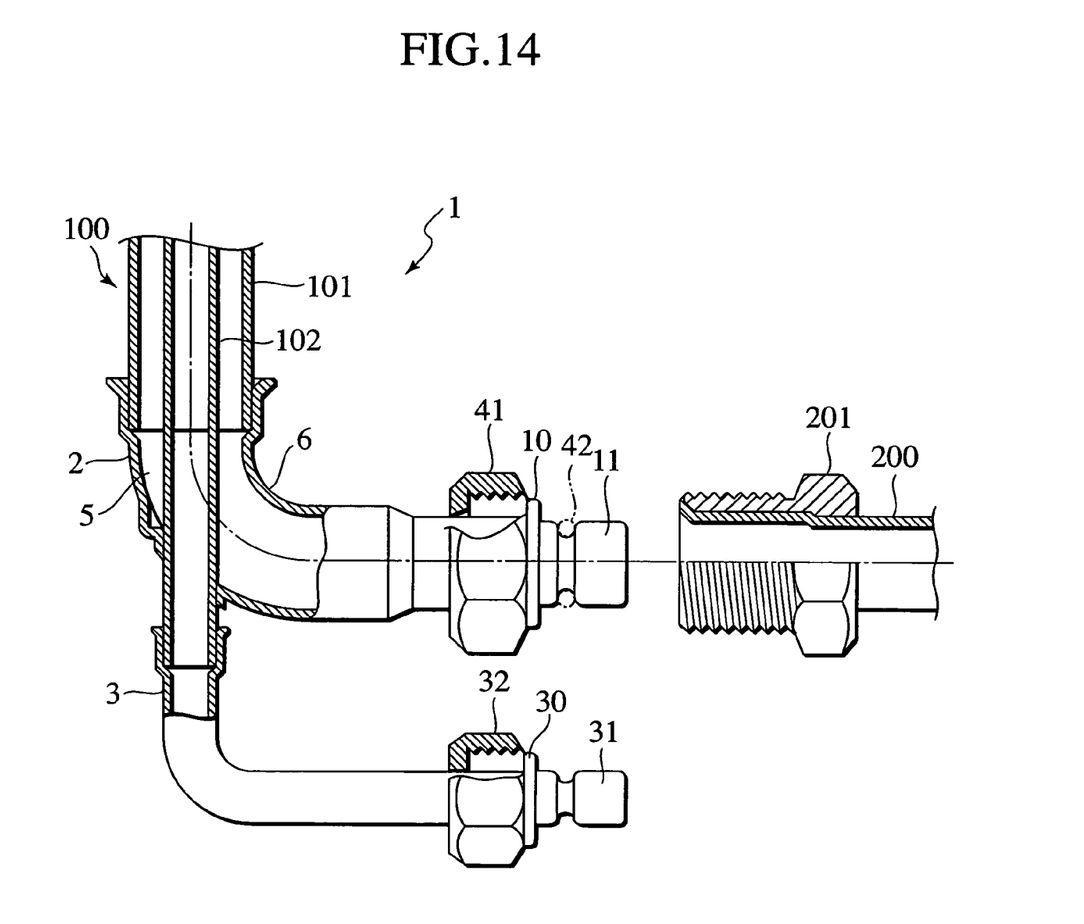
FIG. 14 is a partially exploded side view of still another embodiment.

With reference to FIG. 14, the double tube coupling 1 may employ a cylinder coupling in place of coupling flange 4. The cylinder coupling includes a pair of an external nut 41 and an internal plug 201. The external nut 41 is located in proximity to flange portion 10. The external nut 41 has a thread inside thereof. The flange portions 10, 11 have an O-ring 42 therebetween, which seals the inner surface of a mating pipe 200. The internal plug 201 is fixed to the outer surface of the mating pipe 200. The internal plug 201 has a thread outside thereof. The operation is started with inserting of the internal plug 201 in the external nut 41. The external nut 41 is rotated around internal plug 201 to mesh the threads with each other. The external nut 41 and the internal plug 201 axially approach to each other to stop when the end of internal plug 201 and the bottom of nut 41 abut against flange portion 10.

The connecting tube 3 may include a cylinder coupling of an external nut 32 and an internal plug of a mating pipe (not illustrated). The external nut 32 is axially movable to and rotatable around connecting tube 3. The external nut 32 stops against flange portion 30.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

According to the first aspect, forming of the branched portion with the curved tube allows production at low costs, in comparison with cutting work or assembling of members. The thin branched portion shortens preheating time during brazing, thus enhancing productivity.

The first aspect allows the inner tube to be stably held by the burr portion, and the inner tube to be enlarged in brazed area, which enhances reliability.

The first aspect facilitates the joining of the outer tube to the branched portion, thus enhancing productivity.

The first aspect does not require holding of brazing material during brazing of the outer tube to the branched portion, which enhancing workability.

The first aspect prevents braze failure caused by a gap between the inner surface of the curved portion and the inner tube at a brazed portion of the curved portion and the inner tube.

The first aspect allows braze fixing of the outer and inner tubes, without locating another brazing material in the branched portion, thus enhancing productivity. The first aspect reduces portions with brazing-material layers, in comparison with the outer and inner tubes having brazing-material layers respectively, thus rendering productive costs low.

The first aspect allows the inner tube to be brazed so as to avoid a thin portion in the curved portion. This improves mechanical strength of a brazed portion, thus enhancing reliability.

According to the second aspect, bending and pressing of the branched portion allows easy production at low costs.

The second aspect forms the burr portion during the formation of the through-hole, thus allowing formation of the expanded radial portion without increment of the number of steps.

The second aspect forms the brazing-material holding portion during the formation of the through-hole, thus allowing formation of the brazing-material holding portion without increment of the number of steps.

The second aspect allows braze fixing of the outer and inner tubes, without locating another brazing material, thus enhancing productivity. The second aspect reduces portions with brazing-material layers, in comparison with the outer and inner tubes having brazing-material layers respectively, thus rendering productive costs low.

What is claimed is:

1. A coupling assembly comprising:
   a coupling configured to connect with a double tube, the double tube comprising:
      an outer tube for a first fluid to flow therethrough; and
      an inner tube provided inside of the outer tube and having an end protruding from the outer tube, the inner tube for a second fluid to flow therethrough,
   the coupling comprising a branched portion brazed to an end of the outer tube and brazed to an end of the inner tube, and
   the branched portion formed as a curved tube having a curved portion, wherein the curved portion has a through-hole and a burr portion and wherein the inner tube protrudes through the through-hole and the burr portion contacts an outer peripheral surface of the inner tube.

2. A coupling assembly according to claim 1,
   wherein the branched portion has an end formed with an expanded radial portion configured to receive and axially position the outer tube.

3. A coupling assembly according to claim 1, wherein the branched portion has an end having a distal end bent outwardly to form a brazing-material holding portion.

4. A coupling assembly according to claim 1,
   wherein the branched portion is brazed to the end of the outer tube and is brazed to the end of the inner via a brazing-material layer on an inner surface of the branched portion.

5. A coupling assembly according to claim 1,
   wherein the inner tube is positioned off-center from an inner path of the branched portion.

6. A coupling assembly comprising:
   a coupling configured to connect with a double tube, the double tube comprising:
      an outer tube for a first fluid to flow therethrough; and
      an inner tube provided inside of the outer tube and having an end protruding from the outer tube, the inner tube for a second fluid to flow therethrough,
   the coupling comprising a branched portion brazed to an end of the outer tube and brazed to an end of the inner tube, and
   the branched portion formed as a curved tube having a curved portion wherein the curved portion has a through-hole and the inner tube protrudes through the through-hole and wherein the curved portion has an inner surface formed with a stepped brazing-material holding portion configured to receive and support a ring-shaped brazing material fitted coaxially to the inner tube.

7. A coupling assembly according to claim 6,
   wherein the branched portion has an end formed with an expanded radial portion configured to receive and axially position the outer tube.

8. A coupling assembly according to claim 6, wherein the branched portion has an end having a distal end bent outwardly to form a brazing-material holding portion.

9. A coupling assembly according to claim 6,
   wherein the inner tube is positioned off-center from an inner path of the branched portion.

* * * * *